United States Patent [19]

Murakami et al.

[11] Patent Number: 4,750,049
[45] Date of Patent: Jun. 7, 1988

[54] HAND-HELD COPYING APPARATUS

[75] Inventors: Kiyotaka Murakami, Tama; Masanori Kawai; Tatsuji Kurogama, both of Hachioji, all of Japan

[73] Assignee: Konishiroku Photo Industry Co., Ltd., Tokyo, Japan

[21] Appl. No.: 890,082

[22] Filed: Jul. 24, 1986

[30] Foreign Application Priority Data

| Jul. 30, 1985 | [JP] | Japan | 60-166880 |
| Oct. 8, 1985 | [JP] | Japan | 60-222702 |
| Oct. 8, 1985 | [JP] | Japan | 60-222705 |
| Oct. 18, 1985 | [JP] | Japan | 60-223006 |

[51] Int. Cl.⁴ ............................................. H04N 1/04
[52] U.S. Cl. ................... 358/296; 346/76 PH
[58] Field of Search ............... 358/285, 288, 293, 296; 346/76 PH

[56] References Cited

U.S. PATENT DOCUMENTS

| 4,523,235 | 6/1985 | Rajchman | 358/293 X |
| 4,573,058 | 2/1986 | Brooks | 346/76 PH |
| 4,574,317 | 3/1986 | Scheible | 358/293 X |
| 4,575,733 | 3/1986 | Hattori et al. | 346/76 PH |
| 4,607,262 | 8/1986 | Moriguchi et al. | 346/76 PH |
| 4,639,790 | 1/1987 | Kusaka | 358/293 |
| 4,652,937 | 3/1987 | Shimura et al. | 358/293 X |

Primary Examiner—Clifford C. Shaw
Attorney, Agent, or Firm—Jordan B. Bierman

[57] ABSTRACT

A hand-held copying apparatus has a reading window of a read division disposed on a leading end outwardly of two parallel rollers which define a reference plane placed on the surface to be read. A storage division for storing information read by the read division is provided integrally with the read division, and information stored in the storage division is recorded through a recording head which is moved relatively along a recording paper at a speed corresponding to the moving speed of the apparatus detected by a movement encoder mechanism.

8 Claims, 14 Drawing Sheets

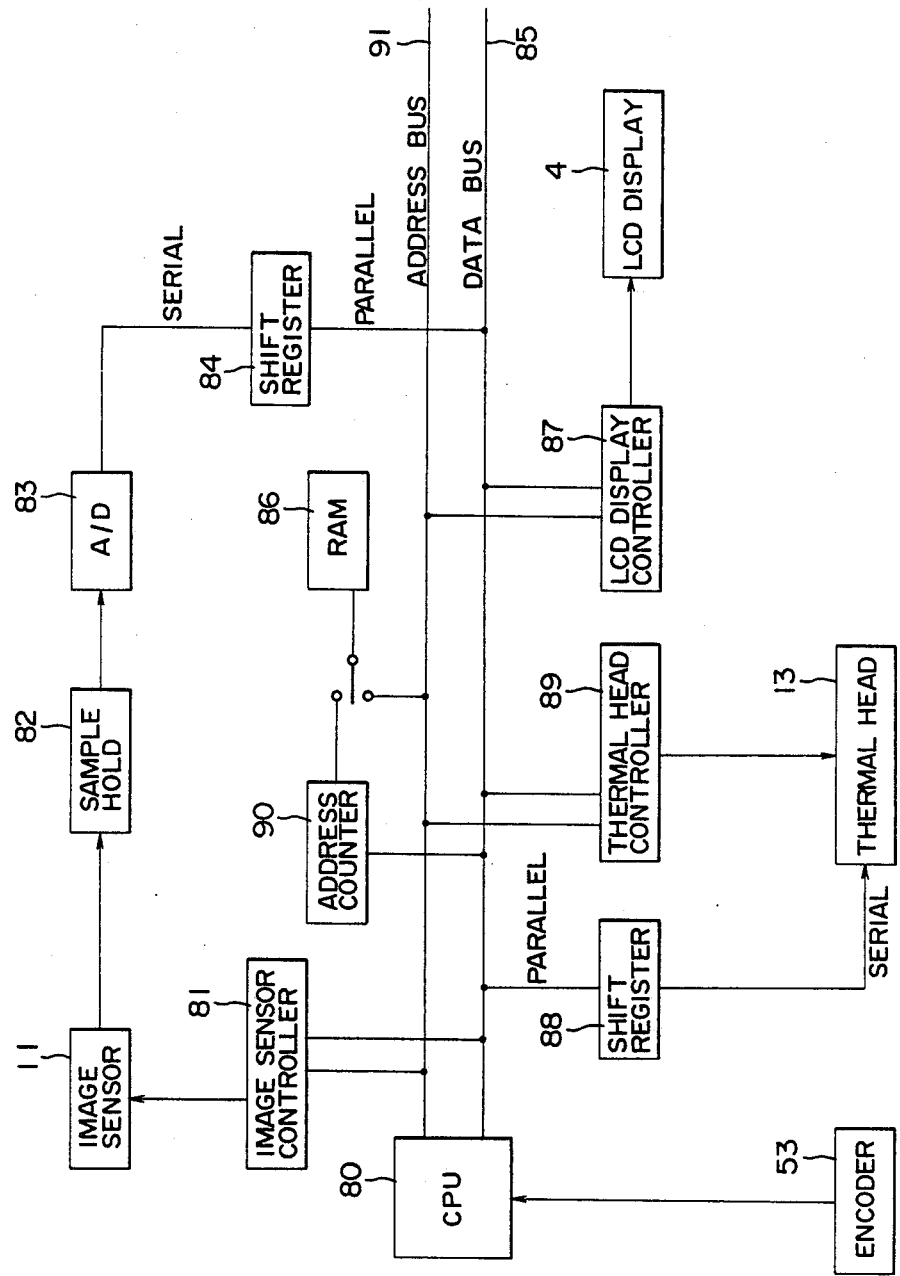

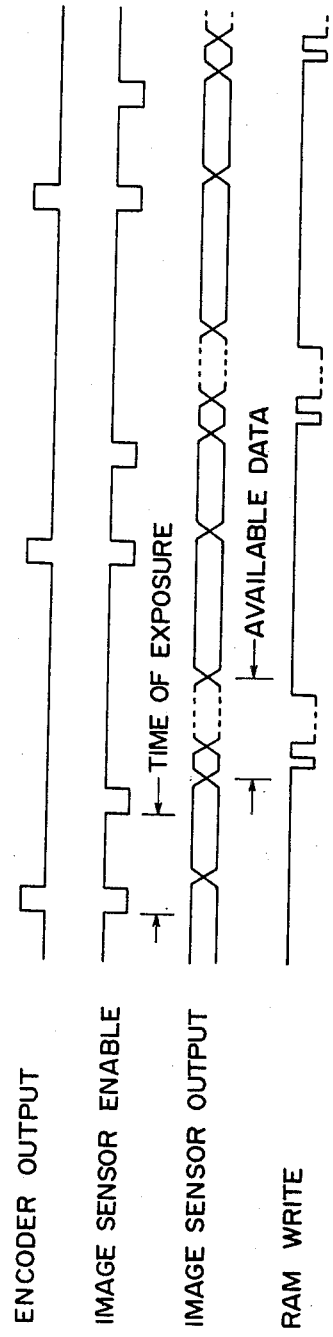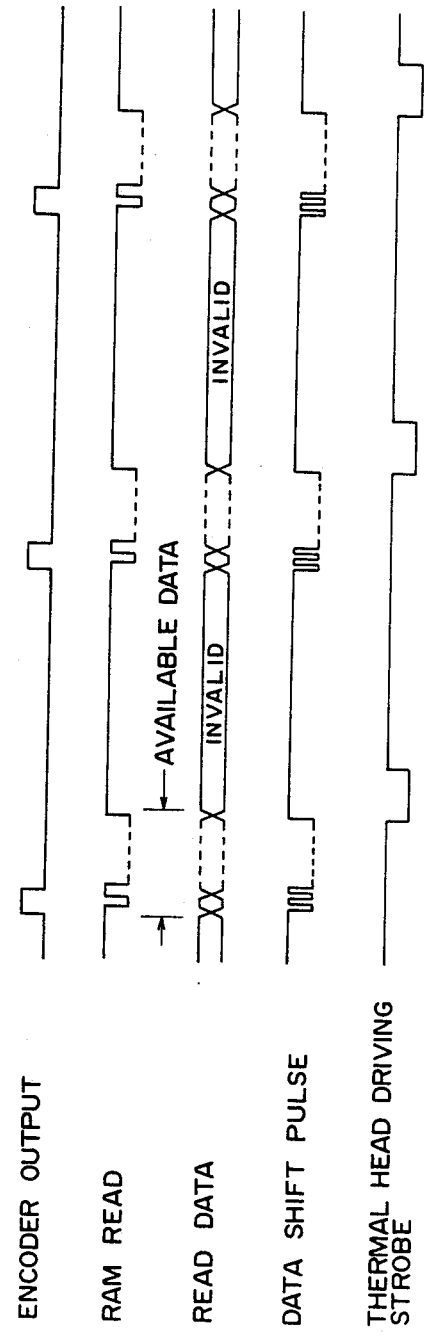

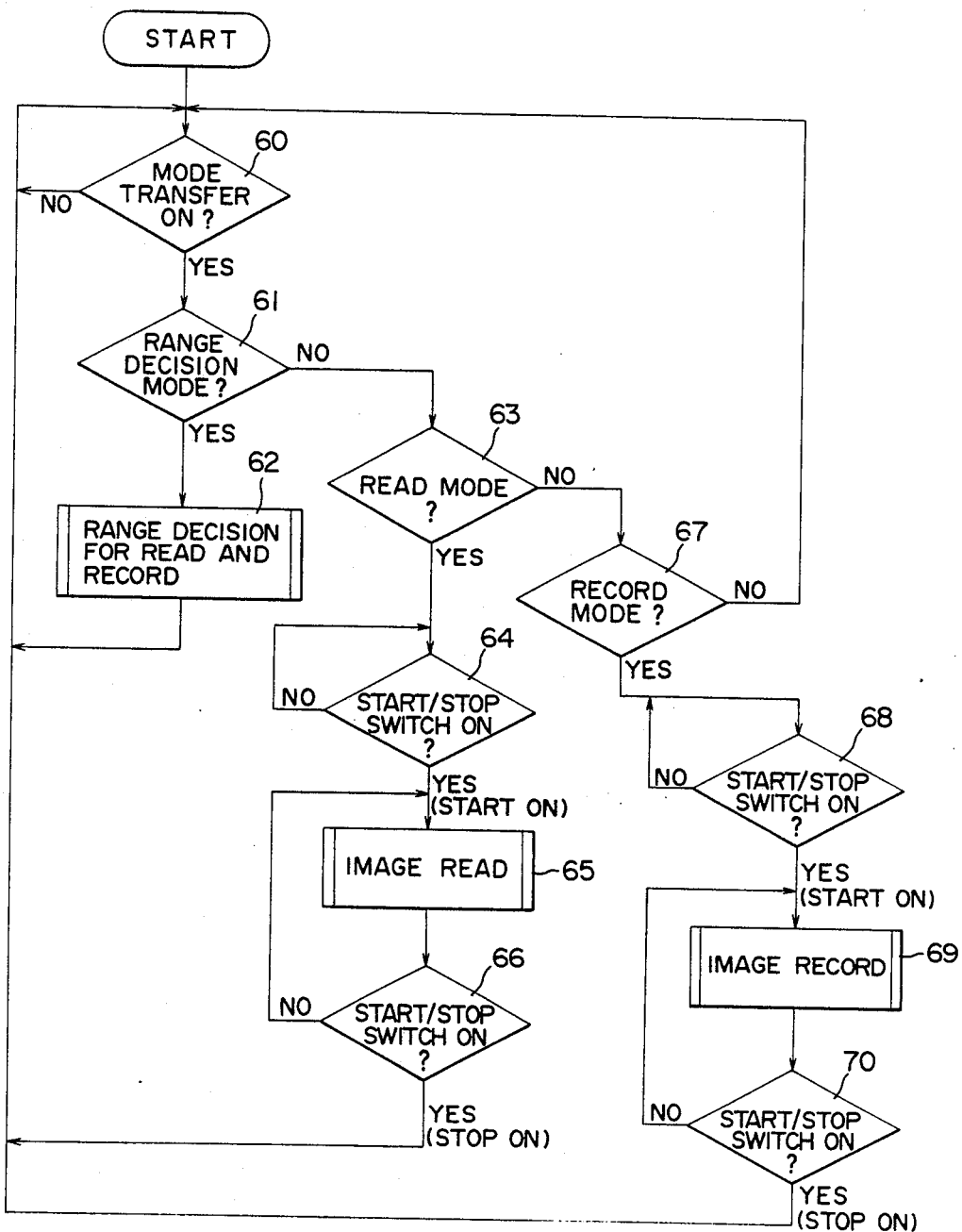
F I G. 14

F I G. 15
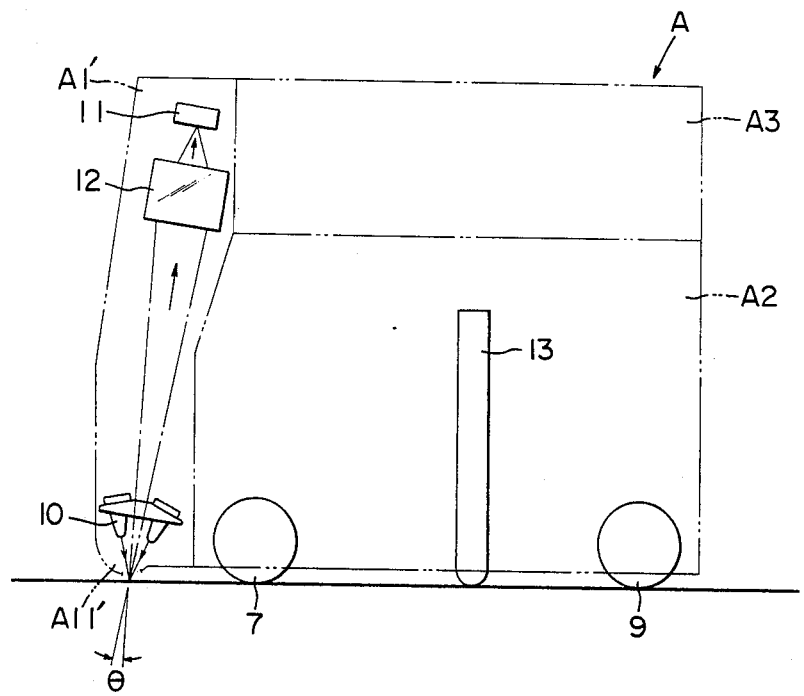
F I G. 16
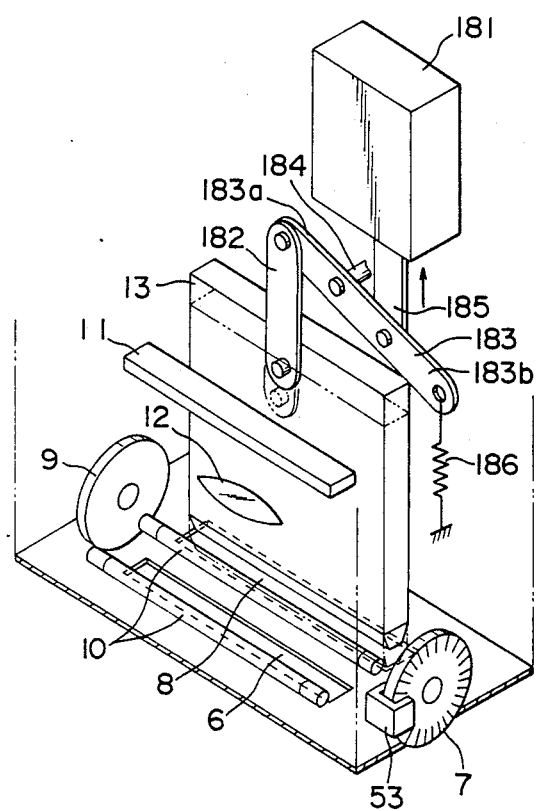

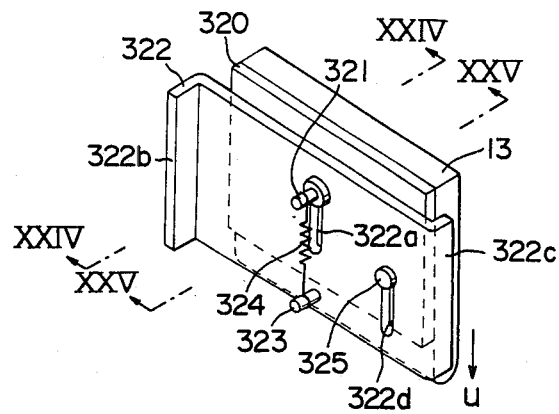
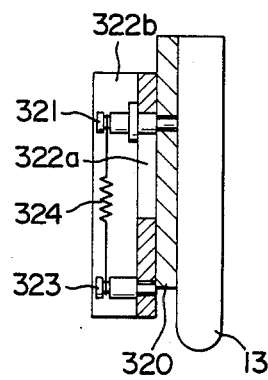
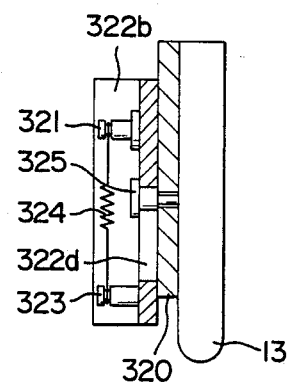
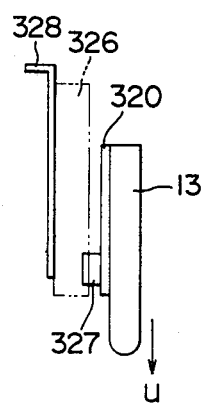
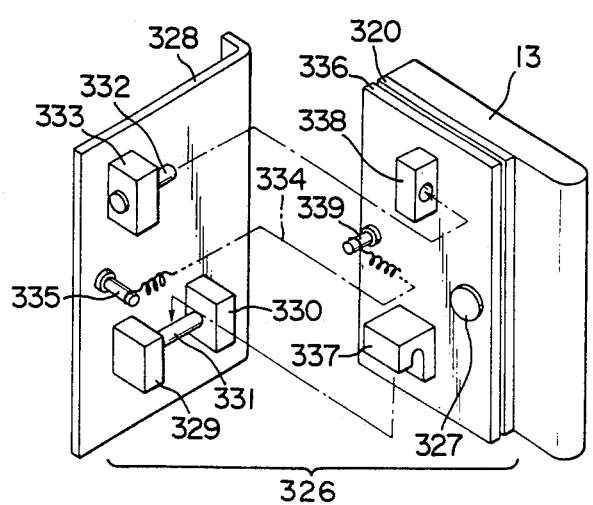

HAND-HELD COPYING APPARATUS

BACKGROUND OF THE INVENTION

1. Field of the Invention

The present invention relates to a hand-held copying apparatus.

2. Description of the Prior Art

As disclosed in Japanese Patent Laid-Open No. 115773/1980, there is proposed a copying apparatus which is enclosed in one case as a whole. A reading window is set on a lower surface portion at the center of a body, which has a problem that an image on a marginal portion near a book binding cannot be read thoroughly.

Then in the case of a hand-held recording apparatus, images and characters are recorded at a predetermined moving rate by moving the apparatus manually in the direction intersecting longitudinally with a recording head incorporated therein. However, in a conventional recording apparatus of this kind, the thermal head used particularly for a recording head must be kept in contact with a surface to be recorded (or recording paper). Therefore the head is left protruding downward (toward a body) at all times, and may sustain damage to an important heating element provided on its tip, ribbon is also exposed at the tip, which may incur damage at the same time.

On the other hand, in a conventional thermal printer of manual scanning type which is placed on a recording paper and scanned (sub-scanned) by hand for recording characters or pictures on the recording paper, the width of a driving pulse for heating the thermal head and a voltage therefor are set to constant values. When scanning at a rate exceeding a normal range, the pulse duty cycle is raised, the thermal head is driven for recording the next data before it radiates heat completely, i.e., heat is accumulated, and thus the printed dots become large or the printing density becomes thick resulting in deterioration of the print quality. A relation between a scanning rate pulse A from an encoder and a head driving pulse B' is shown in FIGS. 22(a) and 22(b). In this case, the width of the pulse B' is constant, however, in the case of high-speed scanning, the pulse duty cycle becomes excessively high.

On the other hand, in a thermal printer feeding a recording paper automatically, deterioration of the print quality is prevented by detecting a temperature of the thermal head and controlling the driving pulse width according to the detected result. However, the system will entail a delay in thermal conduction, and for avoiding the delay an extremely small sensor must be provided near the heating element, which is problematical in workability and cost.

Then, in the case of a recording head incorporated in a hand-held recording apparatus moved by hand for recording on a paper, the head front must be applied correctly to a reference plane of the apparatus corresponding to a surface of the recording paper. The structure for pressing the head evenly with a spring has been rather complicated.

SUMMARY OF THE INVENTION

An object of the invention is to provide a hand-held copying apparatus capable of reading a portion near the binding margin of a book.

To attain the object, a reference plane is formed by parallel surfaces to be moved along the surface to be read, a read division disposed on an outside of two adjacent surfaces and a storage division for storing information read by the read division are provided integrally, and the information stored in the storage division is recorded by a recording head.

Another object of the invention is to provide a hand-held recording apparatus wherein a recording head and a ribbon are kept from external damage.

The invention therefore uses a recording head withdrawable from a recording position.

A further object of the invention is to provide a recording controller for enabling a manual scanning type thermal printer to attain a high quality recording despite change in a scanning rate.

The recording controller according to the invention therefore changes a thermal energy to be impressed on a thermal head according to the scanning rate.

Another object of the invention is to provide a recording head holding mechanism simple in structure which is effective in bringing the head to abut uniformly on a recording paper.

Thus in the invention the head is supported at one spot to keep a recording portion of the head abutting on the recording paper uniformly.

Other objects and features of the invention will be clarified according to a description of the accompanying drawings.

BRIEF DESCRIPTION OF THE DRAWINGS

FIG. 11 is a view showing an entire circuit;

FIG. 12 is a timing chart for writing an image;

FIG. 13 is a timing chart for outputting image;

FIG. 14 is an entire function flowchart;

FIG. 15 is a view of another embodiment of the copying apparatus;

FIG. 16 is a schematic perspective view of a simple copying apparatus given in another embodiment;

FIG. 23 is a perspective view showing a head holding mechanism given in another embodiment of the invention;

FIG. 24 is a sectional view taken along line XXIV—XXIV of FIG. 23;

FIG. 25 is a sectional view taken along line XXV—XXV of FIG. 23;

FIG. 26 is a side view of a head holding mechanism given in another embodiment;

FIG. 27 is an exploded perspective view of the mechanism of FIG. 26;

DESCRIPTION OF THE PREFERRED EMBODIMENTS

The invention will now be described according to an illustrative example applied to a hand-held simple copying apparatus which is moved by hand for scanning. The simple copying apparatus has a function to read images and characters and another function to record (write) the read-out content on a recording paper.

Figure 1:
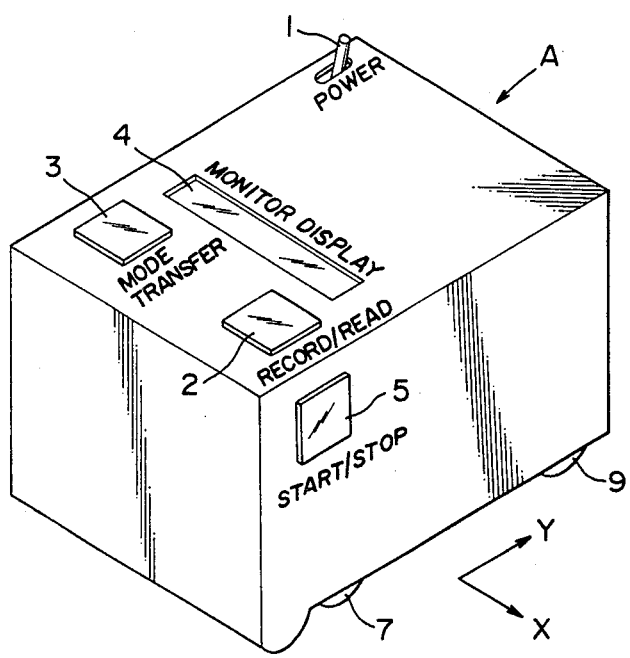
FIG. 1 is a perspective view showing a surface appearance of a simple copying apparatus given in one embodiment of the invention.

FIG. 1 is a view showing schematically and overall a simple copying apparatus A, which is provided with a lever type main power on/off switch 1, a reading/recording switch 2 for switching between a reading mode and a recording mode, a mode transfer switch 3 for selecting a reading or recording range (width and length) and others through a push button operation, and a monitoring LCD display 4 for indicating a read update content on its upper surface, and a start/stop switch 5 for switching between a start operation and a stop operation on the side.

Figure 2:
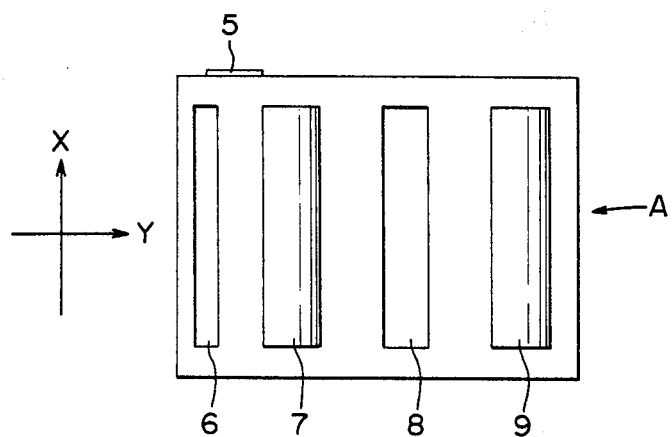
FIG. 2 is a bottom view of the apparatus.

On the bottom of the apparatus, a reading window 6, a long reference roller 7 rolling axially, a recording window 8, and a long auxiliary roller 9 traveling axially are disposed in that order, as shown in FIG. 2, on the bottom of the simple copying apparatus A from the leading side (left side in the drawing) in a traveling direction. The traveling reference roller 7 and the traveling auxiliary roller 9 are supported and positioned near both ends of the apparatus A to have the center of gravity between the two rollers 7, 9, thus ensuring a stable position both longitudinally and laterally at the time of traveling.

Figure 3:
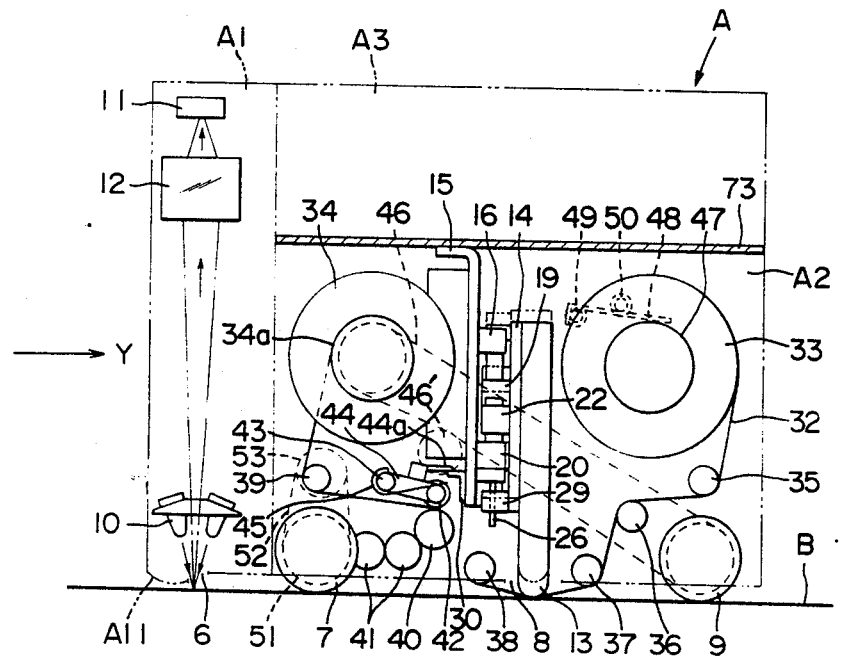
FIG. 3 is a side view showing the interior of the apparatus.
Figure 4:
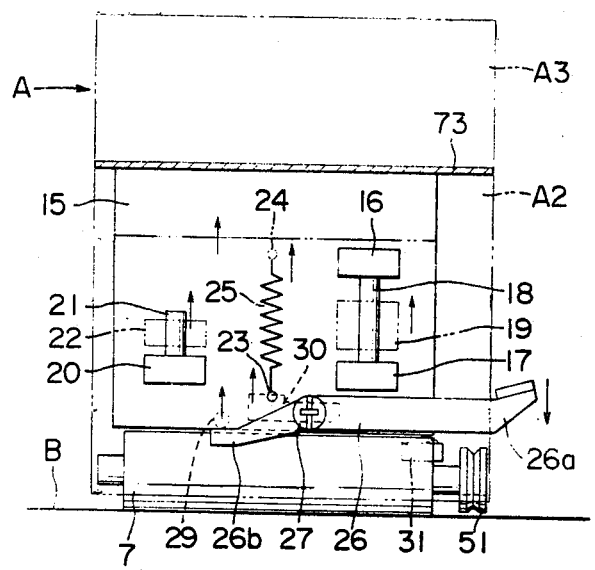
FIG. 4 is a view showing an internal head regulating plate portion of the apparatus.

As shown in FIG. 3 and FIG. 4, the interior of the simple copying apparatus A is constituted of a reading division A1, a recording division A2 and a storage/control division A3.

First, the reading division A1 is constituted of an illumination light source 10 comprising light emitting diodes in two rows in a direction X (vertical direction of FIG. 3) for lighting downward from the reading window 6, and a lens 12 for focusing and imaging a picture light reflected from a surface to be read to a read image sensor 11 (which is parallel with the axes of the rollers 7, 9) comprising CCD or MOS solid state or other types of pickup elements. The read image sensor 11 is subjected to a main scanning operation in the axial direction (or in the direction X) on a signal generated by an encoder which will be described hereinafter, for a constant moving rate of the entire apparatus A in the direction Y. The reading operation in the sub-scanning direction is carried out in lines at equal intervals as the apparatus is moved in the direction Y.

As described, since the reading division A1 has the reading window 6 set at a portion ahead of the traveling reference roller 7, namely a position near the leading side of the apparatus A, reading can be performed even up to the binding margin of a book. Then, a lower surface A11 at a tip portion of the reading division A1 protrudes downward, and the portion and the traveling reference roller are used for reading even if the traveling auxiliary roller is lifted from the surface to be read.

The recording division A2 forms a reference plane B in contact with a surface of the recording paper or a surface to be read, which is defined by the lowermost surface of the traveling reference roller 7 and the traveling auxiliary roller 9. A thermal head 13 (longitudinal in the direction X) as the recording head projects through the recording window 8 between the traveling reference roller 7 and the traveling auxiliary roller 9, for recording on a paper disposed on the reference plane B for a constant moving rate of the entire apparatus A. That is, the recording is carried out in lines at equal intervals.

The thermal head 13 has heating elements arranged longitudinally on its tip, and is movable vertically against a biasing force pushing it downward through the recording window 8. That is, the head 13 is fixed on a head holding plate 14, and the head holding plate 14 is movable vertically relative to a head regulating plate 15.

Figure 5:
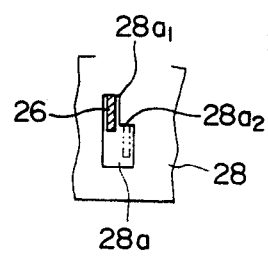
FIG. 5 is a view showing a locking state of a lever for moving a head.
Figure 6:
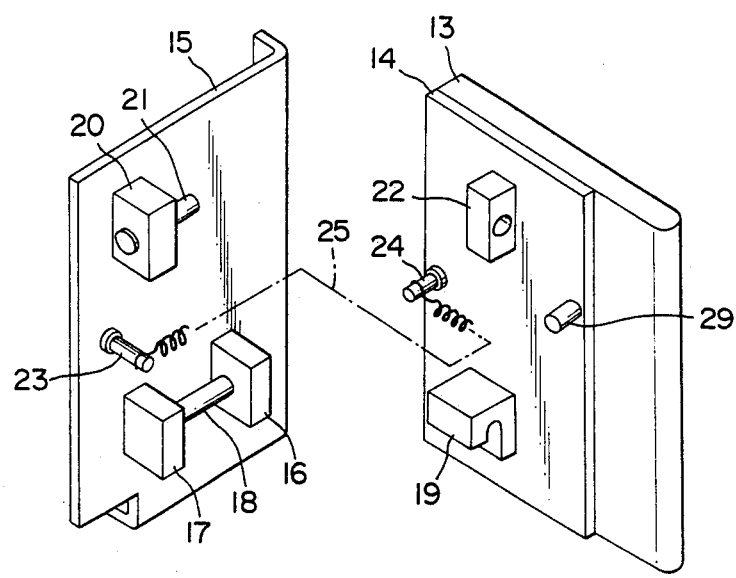
FIG. 6 is an exploded perspective view of a head holding plate and a head regulating plate.

A mechanism for moving head vertically, as shown in FIG. 4 to FIG. 6, has a ⊐-shaped locating block 19 fixed on the head holding plate 14 movable on a shaft 18 between head regulating blocks 16, 17 fixed on the head regulating plate 15. A locating block 22 fixed on the head holding plate 14 movable on a shaft 21 of a head regulating block 20 fixed on the head regulating plate 15.

Then, a tension spring 25 is laid between a pin 23 provided on a lower side of the head regulating plate 15 and another pin 24 provided on an upper side of the head holding plate 14.

Further, a lever 26 is pivoted rotatably through a shaft 27 on the head regulating plate 15, one end portion 26a of the lever 26 protrudes from a slit 28a formed on an outer case 28, and the other end portion 26b is kept in contact with a lower surface of a pin 29 provided on the head holding plate 14.

A release plate 30 is mounted on the shaft 27 of the lever 26 which is fixed to the opposite side of in the head regulating plate 15, and the release plate 30 is rotatable according to a rotation of the lever 26.

Further, a microswitch 31 is disposed below the lever 26, and on depressing the end portion 26a of the lever 26, the switch 31 is turned to the off position. The switch 31 is inserted in series in the main power switch 1 and functions as a power switch for the recording division.

As described above, the head 13 is energized with a downward resilience by the spring 25 with its movement guided by the vertically moving mechanism when one end portion 26a of the lever 26 comes in contact with an upper corner 28a₁ of the slit 28a, as shown in FIG. 5, simultaneously with the pin 29 of the head holding plate 14 coming in contact with the other end portion 26b of the lever 26, a lowermost position of the head 13 is determined, at a position somewhat lower than the reference plane B.

Accordingly, when the apparatus A is pressed to have a lower end of the head 13 leveled with the reference plane B, the head 13 is pressed onto the reference plane B at a predetermined pressure.

Then, when the one end portion 26a of the lever 26 is pushed downward to locking with an intermediate step 28$a_2$ of the slit 28a, the head 13 is positioned ascendingly against a tensile force of the spring 25, and thus the microswitch 31 is kept off as described hereinabove.

On the other hand, a reference numeral 32 denotes a broad ink ribbon (heat transfer ribbon), which is laid on a tip of the head 13 so as to be taken up onto a take-up reel 34 (ribbon take-up motion) from a master reel 33. The master reel 33 is disposed vertically of the traveling auxiliary roller 9, and the take-up reel 34 is disposed vertically of the traveling reference roller 7. The ribbon 32 is laid on a moderate tension applied by holding rollers 35 to 39, and a ribbon feed roller 40 is provided between the rollers 38, 39.

The ribbon feed roller 40 rotates to receive a turning force of the traveling reference roller 7 through a plurality of gears 41 and constitutes a ribbon feed motion together with a ribbon pressure roller 42, and the ribbon 32 is fed forcedly by the feed motion at the rate almost equal to a traveling rate of the apparatus A according to a rotation of the traveling reference roller 7, or according to the traveling rate of the apparatus A.

Then, the ribbon pressure roller 42 is mounted on a tip of a lever 44 pivoted on a pressure roller support pin 43 and exerts a pushing force on the ribbon feed roller 40 through a spring 45 laid on the pin 43. The release plate 30 rotating jointly with the lever 26 is locked on a protrusion 44a of the lever 44.

As described above, accordingly, when the one end portion 26a of the lever 26 is pushed downward to lock on the intermediate step 28$a_2$ of the slit 28a, a rotation of the lever 26 turns the release plate 30, the lever 26 is pushed up against the spring 45, and thus the ribbon 32 is released from pressurization. Even if the traveling reference roller 7 rotates under the state and the ribbon feed roller 40 rotates, the ribbon will not be fed forcedly.

The above-mentioned take-up reel 34 receives a turning force of the traveling auxiliary roller 9 to provide a take-up motion through a square belt 46 laid between it and the traveling auxiliary roller 9 under tension by a pulley 46'. Its take-up rate exceeds a feed rate by the ribbon feed roller 40 by taking the inside diameter into consideration.

Figure 7:
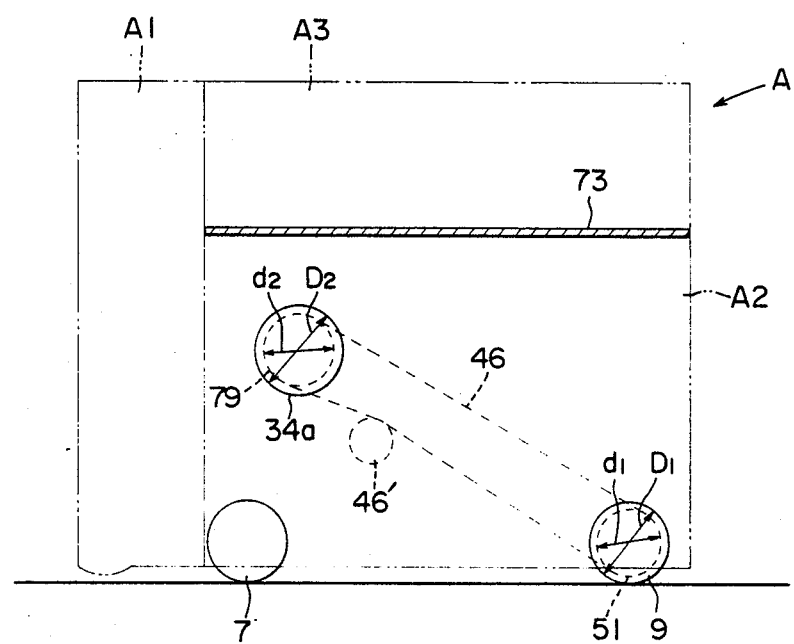
FIG. 7 is an explanatory drawing of a motion mechanism for taking up a ribbon regardless of the moving rate.

That is, as shown in FIG. 7, an outside diameter $D_2$ of an inner cylinder 34a of the take-up reel 34 is set (initialized) to satisfy $$D_2 \geq D_1 (d_2/d_1)$$

where $D_1$ is a diameter of the traveling auxiliary roller 9, $d_1$ is a diameter of a pulley 51 coaxial with the roller 9, and $d_2$ is an outside diameter of a pulley 79 for the square belt 46 which is coaxial with the reel 34. Consequently, the ribbon outside diameter on a take-up side becomes gradually larger than $D_2$ as the ribbon 32 is taken up onto the take-up reel 34, and thus the ribbon take-up rate is incremental to a constant moving rate. The take-up rate exceeds the moving rate, accordingly.

Thus, a used ribbon can be taken up without using other parts. The take-up reel 34 can be driven by on a turning force of the traveling reference roller 7.

Figure 8:
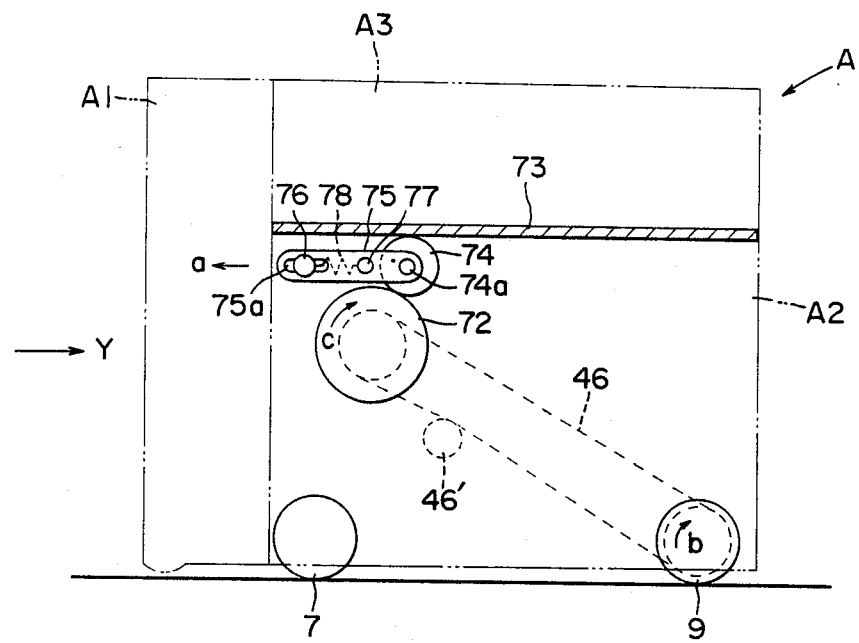
FIG. 8 is a side view showing a portion of a ribbon traveling direction regulating mechanism.
Figure 9:
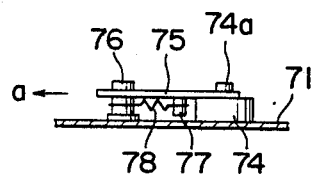
FIG. 9 is a view showing the ribbon traveling direction regulating mechanism in FIG. 8 from a lower side.

On the other hand, there is provided a ribbon traveling regulating mechanism (back stop) for keeping the ribbon 32 moving one-way. As shown in FIG. 8 and FIG. 9, a wheel 72 is mounted coaxially on a lower side (back plate 71) of the take-up reel 34 and also fixedly on the reel 34, a back-stop wheel 74 is disposed between the wheel 72 and a top plate 73, and the wheel 74 is pulled toward wheel 72. A reference numeral 75 denotes a lever for holding a shaft 74a of the wheel 74. The lever 75 is mounted with a pin 76 provided on the back plate 71 inserted in a guide hole 75a formed thereon. Then, a spring 78 is laid between the pin 76 and a pin 77 provided on the lever 75, and thus the wheel 74 is pulled in the direction indicated by an arrow "a" at all times.

Accordingly, when the apparatus A moves in the direction Y, the traveling auxiliary roller 9 rotates in the direction indicated by an arrow "b", the take-up reel 34 coupled through the square belt 46 rotates in the direction indicated by an arrow "c", and the wheel 72 also rotates in the same direction at the same time. In this case, the back-stop wheel 74 rotates under a force counter to the direction "a". However, when the wheel 72 rotates counter to the direction "c", the back-stop wheel 74 moves in the direction "a", receives a force whereby it is drawn between the top plate 73 and the wheel 72 and is caught between the top plate 73 and the wheel 72 to stop the wheel 72 from rotating.

Alternatively, the ribbon traveling regulating mechanism may be a ratchet wheel (not indicated in the drawing) coaxially on a shaft of the ribbon feed roller 40 and disposing a pawl (not indicated in the drawing) and a spring (not indicated in the drawing) on the ratchet wheel. Further, the ratchet wheel, pawl and spring can be configured on a shaft of the gear 41, or a reel shaft of the take-up reel 34, or further on a shaft of the traveling reference roller 7, or a one-way clutch may be incorporated on these shafts.

Even if the apparatus A travels counter to the direction Y, the ribbon will never be fed or taken up counter to the traveling regulating mechanism, and the ribbon 32 is not capable of being damaged unexpectedly. Unexpected backward travel can be prevented by providing the traveling regulating mechanism also on the traveling reference roller 7 and the traveling auxiliary roller 9.

A brake mechanism is incorporated in the ribbon master reel 33. As shown in FIG. 3, the brake mechanism comprises a cylindrical member 47 fixed on the shaft of the master reel 33 outside an area where the ribbon is wound, a pressure spring 48 rubbing elastically with the cylindrical member 47 to function as a brake, a spring holding member 49 for fixing a base portion of the pressure spring 48, and a spring regulating member 50 for pressing the pressure spring 48 moderately on the cylindrical member 47.

The master reel 33 is prevented from running away by the brake mechanism. To adjust a braking effect, the shape of the pressure spring 48 may be altered and further a different kind of material may be bonded on the spring 48 so as to abut on the cylindrical member 47 under an appropriate pressure.

Further, a square belt 52 is laid between the pulley 51 of a shaft of the traveling reference roller 7 provided on a side near the reading division A1 and an encoder 53 provided as a move detecting mechanism, for detecting rotation (traveling rate and speed) of the traveling reference roller 7.

Figure 10:
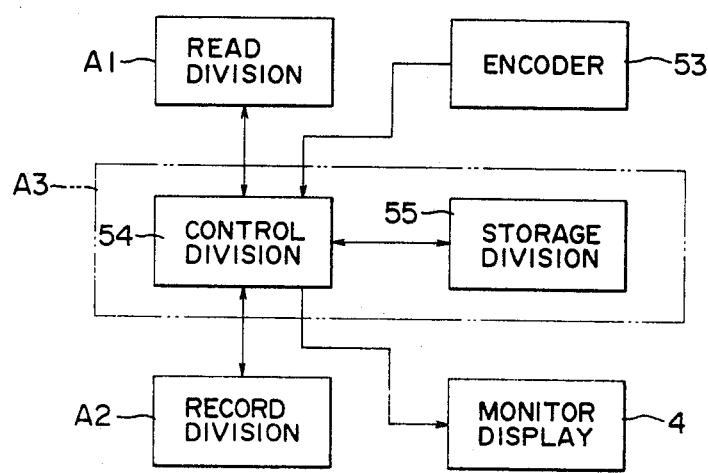
FIG. 10 is a view showing an entire function block.

The storage/control division A3 comprises, as shown in FIG. 10, a control division 54 provided with CPU and ROM in which a system program and other controls are stored, and a storage division 55 consisting of RAM in which picture information is loaded and a memory such as a miniature floppy disk or the like. The picture content read by the reading division A1 is loaded in the storage division 55 by way of the control division 54, and the picture content thus loaded is recorded by the recording division A2 by way of the control division 54. The timing for the reading and recording is controlled by a moving rate detection signal from the encoder 53.

FIG. 11 represents a general circuit configuration. When a picture image is read, the image sensor 11 is controlled by CPU 80 through an image sensor controller 81. The data read there is held by a sample hold circuit 82, converted into a digital signal through an A/D converter 83, turned to parallel data on a shift register 84 to a data bus 85, and is then loaded in RAM 86. The data is indicated on LCD display 4 by LCD display controller 87. For image outputting (recording), data loaded in RAM 86 is read out to the data bus 84, converted into serial data by a shift register 88 and is then recorded by the thermal head 13. The thermal head 13 is controlled by a thermal head controller 89. A reference numeral 90 denotes an address counter for RAM 86, and 91 denotes an address bus. An image writing timing chart is shown in FIG. 12, and an image outputting timing chart is shown in FIG. 13.

Now, when the power switch 1 is turned ON, the lever 26 is detached from the step $28a_2$ of the slit 28a and returned to the upper corner $28a_1$, the head 13 descends by the tensile force of the spring 25 and comes in contact with the reference plane B together with the ribbon 32 under a predetermined pressure of the spring 25. Then, the microswitch 31 is transferred to ON from OFF, and thus the recording division A2 is actuated. Further, the release plate 30 turns the lever 44 of the ribbon pressure roller 42 counterclockwise and brings the ribbon pressure roller 42 into contact with the ribbon feed roller 54.

Thus, a recording is obtainable as wide as the width of the ribbon 32 or the width of the head 13 through a sub-scanning (moving) in the direction indicated by arrow Y. The larger the recording width is, the lesser is the number of scanning operations that need be performed.

On the other hand, when the end portion 26a of the lever 26 is pushed to lock on the step $28a_1$ of the slit 28, the head 13 ascends from the reference plane B, and the head 13 and the ribbon 32 are prevented from being damaged by an external force. The power to the recording division A2 is kept off, further the release plate 30 isolates the ribbon pressure roller 42 from the ribbon feed roller 40, and thus the ribbon feed is also released. Accordingly, the power supply and the ribbon feed motions are controlled by the vertical position of the head 13.

Then, when the head 13 ascends, the feed roller 40 stops functioning, and if the apparatus A is made to travel in this case, the take-up reel 34 rotates to generate a take-up force of the ribbon 32; however, the ribbon feed is regulated by the brake mechanism of the master reel 33 and also by a resistance of the feed system consisting of the rollers 32 to 39.

FIG. 14 shows a flow diagram for reading and recording operations of the apparatus A. A control operation is selected by the reading/recording switch 2, the mode transfer switch 3 and the start/stop switch 5.

At step 60 a test is made whether the mode transfer switch 3 is on. At step 61 whether the range (length and width) of reading or recording should be determined or modified is set according to the start-stop switch 5 and the mode transfer switch 3. At step 62 a selected range is set by pushing the start-stop switch a predetermined number of times. At step 63 the read mode is selected by pushing the switch 2 one time. At step 64 reading is started by pressing the start/stop switch 5, reading is carried out at step 65, and reading is stopped at step 66.

A reference numeral 67 denotes a step for selecting whether or not to take a record mode, which comes to YES by pushing the reading/recording switch 2 two times. A reference numeral 68 denotes a step for deciding a record start, 69 denotes a step for record operation, and 70 denotes a step for deciding a record stop.

First, the read operation is carried out as follows. The mode transfer switch 3 is turned on, a read range is determined through the steps 61→62, and a read mode is selected on the reading/recording switch 2 through the steps 60→61→63. When the start/stop switch 5 turned on, the reading operation is started. The traveling reference roller 7 and the traveling auxiliary roller 9 rotate from moving the apparatus A manually, the rotations are detected by the encoder 53 and thus a moving rate of the apparatus A is detected, and then an image is read through the reading window 6 synchronously with the detection signal. Picture information thus read is loaded in a memory of the recording division A2 and an update content is indicated on the display 4. The read operation is completed by pressing the start/stop switch 5 once again.

Next, the apparatus A is set on a recording paper, the head 13 is lowered by the lever 26, and when reaching the step 67 through operation of the mode transfer switch 3 and other parts, the record mode is selected by the reading/recording switch 2, and the head 13 is placed in a predetermined position. The start/stop swtich 5 is then turned on to a recording standby status, heating elements of the head 13 are selectively driven corresponding to the moving rate detected by the encoder 53 as the apparatus A is moved in the direction Y, the ribbon 32 is moved as the apparatus is moved on the recording paper, and a picture image loaded in the storage division A3 is recorded. The recording operation is completed upon pressing the start/stop switch 5. The power supply is turned off upon moving the head 13 upward by the lever 26.

At the time of operation for reading and recording as described above, when RAM is used as the storage division 54, picture information cannot be stored beyond the capacity of the memory, therefore the content must be recorded at one time. However, in case a miniature 2-inch floppy disk is used, the capacity of 800K bytes is provided for continuous reading, and it can be replaced with another floppy disk.

Then, since the encoder 53 is controlled by rotation of the traveling reference roller 7, the reading operation is secured despite the traveling auxiliary roller 9 coming off the surface to be read. Since a dummy reading surface is formed by the protrusion. All of the reading division A1 and the traveling reference roller 7, no dislocation will be caused on the surface to be read. Thus, a binding margin of a book can be read by spreading it with the protrusion A11.

FIG. 15 represents another example, wherein a reading optical axis of a reading division A1' is inclined not by 90 degrees by by $\theta$ at an angle to the reference plane B, and the reading position is set further forward from the tip portion of the reading division A1'. A picture image on a further corner portion of the surface to be read can thus be read, as compared to the reading division A1 in the above-described example.

According to the above example, since the reading division is disposed on the outside of the rollers, an image on the portion near a binding margin of a book can also be read, and further the inner portion can be read particularly by slanting the reading optical axis. Further, the storage division will have an exceedingly large capacity with a miniature floppy disk provided particularly thereon, and thus a large volume of reading and recording can be ensured at a time.

FIG. 16 represents another example of the invention, in which like reference characters denote like parts in the foregoing example. In the example, the head 13 is driven vertically by a solenoid 181, and the head 13 is enclosable. The head 13 is coupled to a lever 182, and the lever 182 is pivoted on one end portion 183a of another rocking lever 183. The rocking lever 183 has the central portion pivoted with a locking pin 184 and another end portion 183b and its periphery pivoted on a piston 185 of the solenoid 181, and the end portion 183b is subjected to a tensile force downward by a spring 186.

In the example, since the solenoid 181 is kept nonexcited before a power signal is supplied, the head 13 is kept away upward on a tensile force of the spring 186 in the interior (FIG. 16); however, once the power signal is supplied, the solenoid 181 is excited and the piston 185 is pulled in, the head 13 protrudes downward from the recording window 8 and is thus ready for recording.

Each example described above refers to the case where the recording head is kept away and enclosed. However, the recording window 8 may be covered after the head is enclosed, which is effective for protecting the head and the ribbon.

Figure 17:
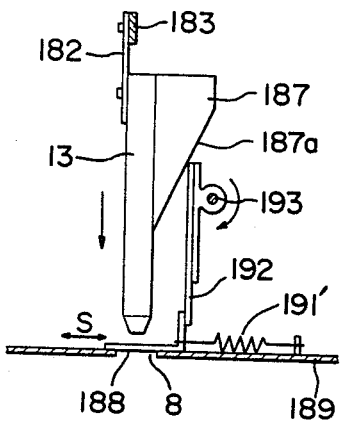
FIG. 17 is a side view showing a window opening mechanism lower than the head in FIG. 16.
Figure 18:
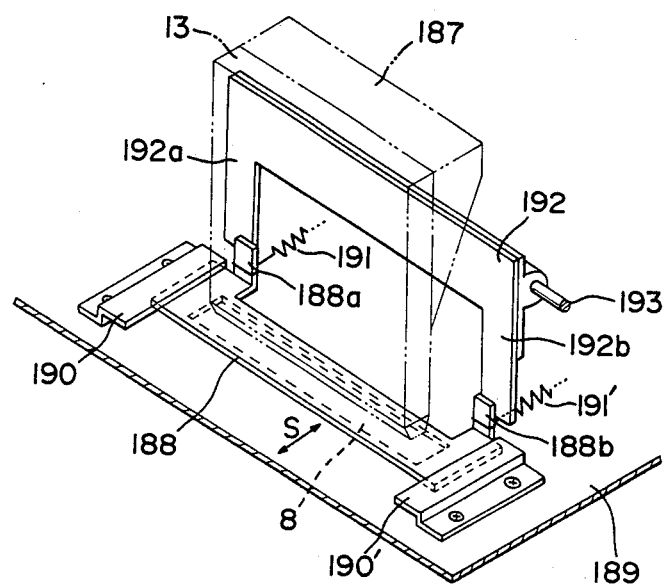
FIG. 18 is a perspective view of the mechanism.

FIG. 17 and FIG. 18 represent a case wherein such covering is provided. Here, the head 13 of the example shown in FIG. 16 is employed. A reference numeral 187 denotes a block fixed on the back of a top of the head 13, wherein the lower surface on a rear side is an inclined plane 187a. A reference numeral 188 denotes a cover with which to shut the recording window 8, whose movement is guided in the direction indicated by an arrow "S" on a baseplate 189 according to guide plates 190, 190'. Ascending pieces 188a, 188b are formed on both sides of the back of the cover 188, which are pulled backward by springs 191, 191'. A reference numeral 192 denotes a driving plate, which is rotatable round a fixed shaft 193, and both arms 192a, 192b come in contact with backs of the ascending pieces 188a, 188b.

In the example, when the head 13 stand as shown in FIG. 17 and FIG. 18, the driving plate 192 is subjected to a turning force by the springs 191, 191', and its upper end is brought into contact with the block 187. When the head 13 is then moved downward, the inclined plane 187a of the block 187 pushes the upper end of the driving plate 192 backward (right-ward in FIG. 17), the arms 192a, 192b of the driving plate 192 push the ascending pieces 188a, 188b forward to shift the cover 188 from the window 8, thus exposing the window 8. Then, when the head 13 descends completely, the cover 188 opens the window 8 fully.

On the other hand, when the head 13 ascends, the driving plate 192 is no more subjected to a pressurization of the block 187, therefore the cover 188 recedes on a tensile force of the springs 191, 191' to shut the window 8.

A gradient of the inclined plane 187a of the block 187 is determined in consideration of a downward moving rate of the head 13 and an opening rate of the recording window 8. That is, the cover 188 and the head 13 will be kept from coming in contact with each other.

As described above, according to the example, the recording head can be kept away from a recording position, therefore the recording head can be prevented from being damaged by an external force by keeping it away when not in service, and further a ribbon, if any, will be also protected.

Figure 19:
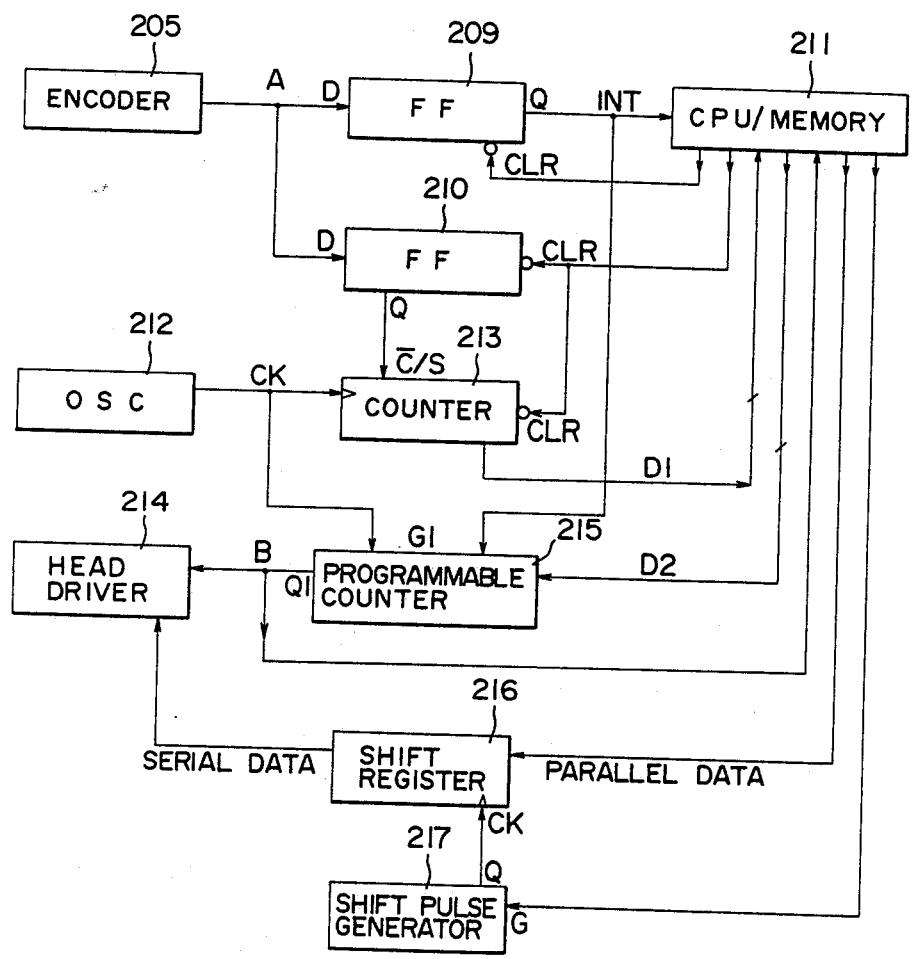
FIG. 19 is a circuit diagram of a printing controller given in another embodiment of the invention.

A further example of the invention will be taken up for description. FIG. 19 shows a circuit for controlling the thermal head 13. An encoder 205 functions as a scanning rate detection means, and a scanning rate pulse A is inputted to flip-flops 209, 210 therefrom. The one flip-flop 209 operates for interruption control to CPU 211 in which memories are incorporated. An oscillator 212 and a counter 213 constitute a recording rate measuring means together with the flip-flop 210, and a counter content corresponding to the time measured thereon is sent to CPU 211. A reference numeral 214 denotes a head driver for driving the thermal head 13 (driving the head for ON/OFF binary recording in the example), and 215 denotes a programmable counter as a means for generating a pulse with variable width. Then, 216 denotes a shift register for converting a parallel record data sent from CPU 211 into a serial record data, and 217 denotes a shift pulse generator for generating a pulse to be sent to the shift register 216.

Figure 20:
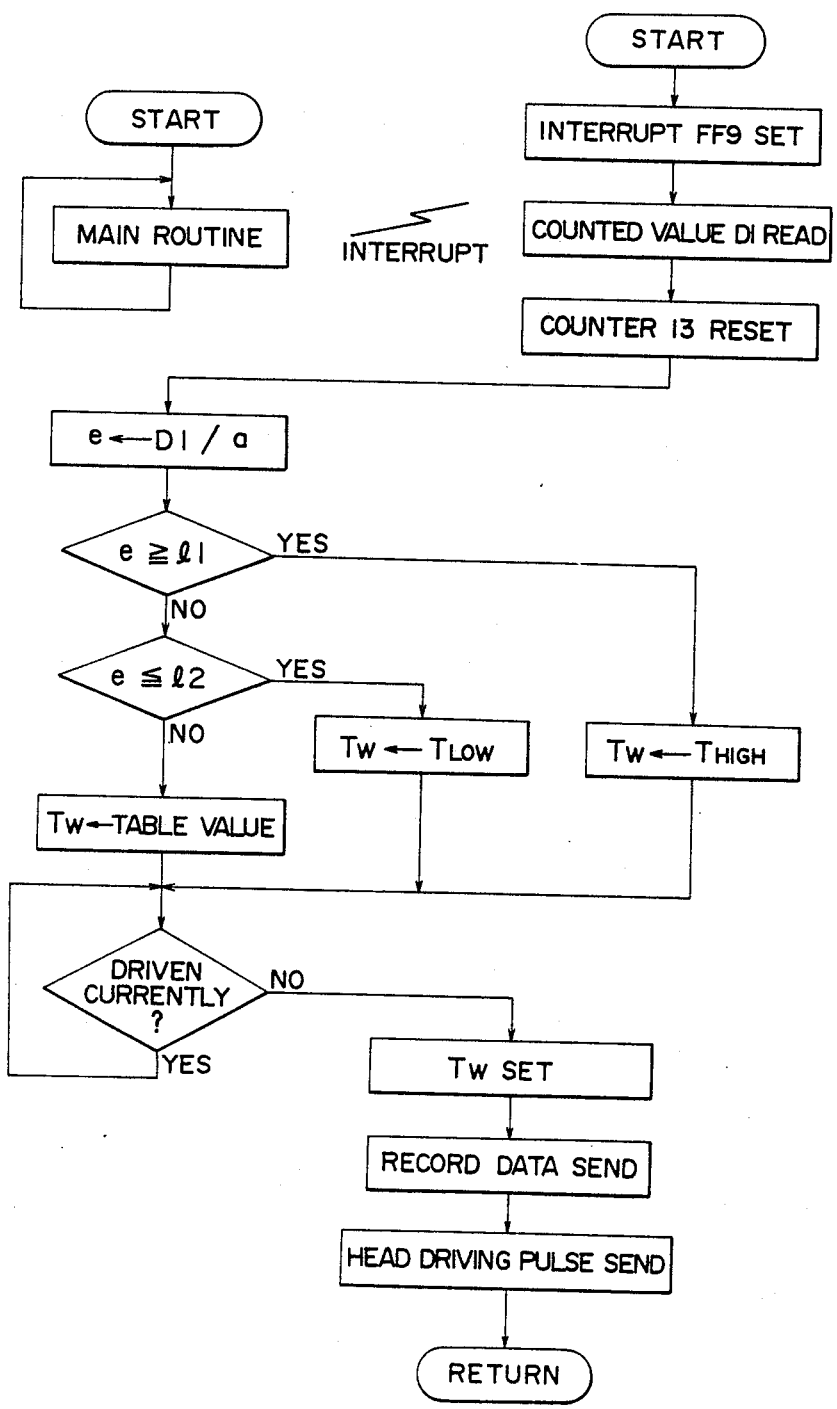
FIG. 20 is a flowchart of the control.

Next, an operation will be described with reference also to the flowchart of FIG. 20. When the system is actuated, CPU 211 executes a main routine and awaits an interruption from the encoder 205. Initialization of a pulse width ($T_{LOW}$ and $T_{HIGH}$ to be described hereinlater being given) is set before entering into the main routine.

When the thermal printer 201 is moved manually, scanning rate pulses in intervals inversely proportional to the scanning rate are output from the encoder 205. Then, when pulses from the encoder 205 enter the flip-flop 209, Q output of the flip-flop 209 comes to H (high level) and an interruption is given to CPU 211. A gate G1 of the programmable counter 215 is set to High (H), and with Q output at H the other flip-flop 210 stops the counter 213 from counting.

The counter 213 counts pulses inputted from the oscillator 212 after being cleared previously. Then, when the interruption is given as described, CPU 211 reads a counted value (D1) of the counter 213. The value indicates the lapse of time from the record timing just prior thereto. The counter 213 is then cleared after reading of the counted value.

Next, CPU 211 sends and sets data (D2) having processed the counted value thus read to the programmable counter 215. Then, it sends parallel printing (recording) data to the shift register 216, drives the shift pulse generator 217 to send a shift pulse to the shift register 216 therefrom, carries out a parallel to serial data conversion at the shift register 216, and sends the serial data to the head driver 214. When a clear signal is output from CPU 211 on the next timing, the flip-flop 209 is cleared.

Upon clearance of the flip-flop 209, the programmable counter 215 becomes ready for enabling and starts counting correspondingly to the set data (D2), an output Q1 remains H during the counting and is inputted to the head driver 214 as a head driving pulse B (thermal energy source). Thus, the head driver 214 drives the selected heating element while the driving pulse is inputted.

The counted value D1 (recording rate measuring signal) obtained on the counter 213 will be processed by CPU 211 as follows. First, the counted value D1 is divided by a predetermined value "a" (classification width at the time of classifying the range of max. pulse width and min. pulse width), and if the divided value "e" is a predetermined upper bound l1 or over, then $T_{HIGH}$ will be set as a driving pulse width Tw. However, if the divided value "e" is a predetermined lower bound l2 or below, $T_{LOW}(<T_{HIGH})$ will be set as the driving pulse width Tw. Then, when it is not the upper bound l1 or over or the lower bound l2 or below, i.e., when it comes between the two, the driving pulse width Tw is determined according to a table value set beforehand (set so as to be proportional to "e"). Thus the driving pulse width Tw is set proportionally to the counted value with $T_{LOW}$ as minimum width value and $T_{HIGH}$ as maximum width value. Then, a data of the driving pulse width Tw is sent and so set to the programmable counter 215 after the head driver 214 finishes driving.

Figure 21:
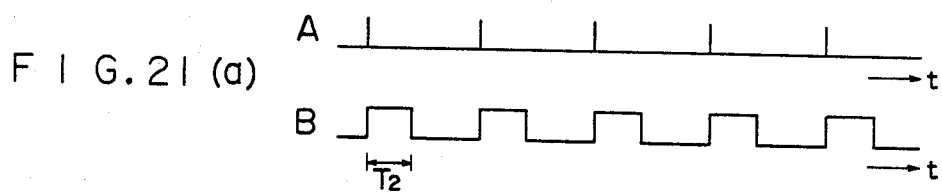
FIGS. 21(a) to 21(c) are waveform diagrams showing a relation between a scanning rate pulse A from an encoder given in one embodiment of the invention and a thermal head driving pulse B.
Figure 21:
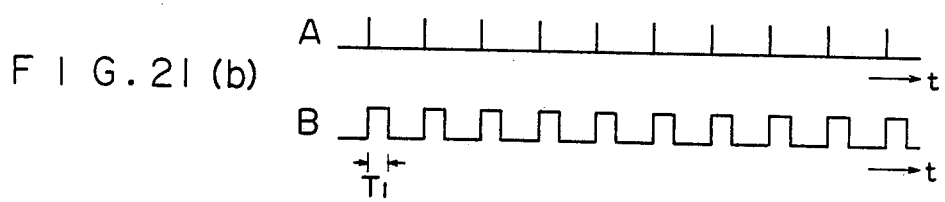
Figure 21:
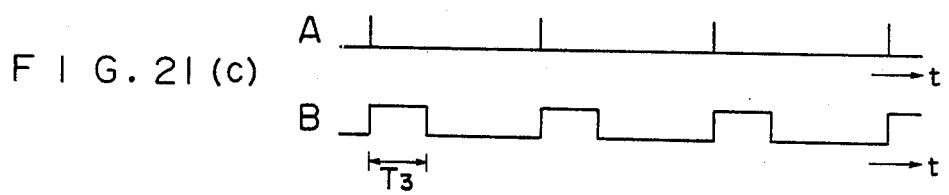
Figure 22:
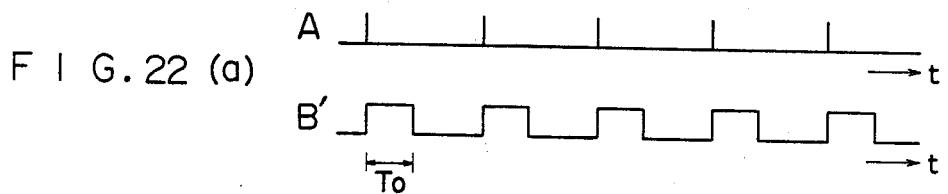
FIGS. 22(a) and 22(b) are waveform diagrams showing relations between a scanning rate pulse A and a driving pulse B' according to a conventional controlling method for a manual scanning thermal printer.
Figure 22:
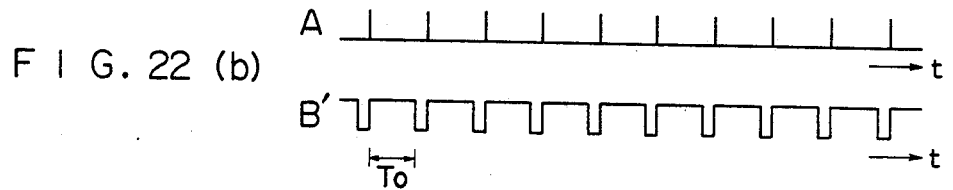

As shown in FIGS. 21(a) to 21(c) consequently, a driving pulse with the width inversely proportional to the interval of pulses from the encoder 5 will be output, and thus the head is radiated effectively. In FIGS. 21(a) to 21(c), $T_1 < T_2 < T_3$.

With a driving frequency as F, uniform and satisfactory printing result was obtained experimentally in the range 0 < F < 1 kHz through controlling the head driving pulse width within 500 μs to 2 ms. In the range 1 kHz < F < 3 kHz, a similar satisfactory result was obtained through adjusting the head driving pulse width to 100 μs to 700 μs. A pulse duty will be preferable at 10 to 50%.

The above-described example refers to the case where an impressed pulse width is changed according to a scanning rate, however, it goes without saying that a problem of unevenness in print density and the like due to a change in scanning rate may be settled by changing an impressed voltage according to the scanning rate while keeping the pulse duty minimized and constant.

Further, the above example also refers to the case where a thermal energy of the thermal head is given to the ribbon to transfer to recording paper; however, the ribbon is not necessarily required. Instead, heat-sensitive paper may be used.

According to the example of the invention, a thermal energy to be impressed on the head is controlled correspondingly to a scanning rate, therefore an effective radiation time can be allowed to the head as compared with that in which the heat energy is fixed hitherto, and thus a deterioration of record quality due to a heat storage action of the head can be prevented effectively.

In another example of the invention, the abovedescribed copying apparatus comprises the recording head 13 held on a holding mechanism shown in FIG. 23 to FIG. 25. In the drawings, the recording head 13 is fixed on a head holding plate 320, and a head elevating means (collared guide pin) 321 is provided on the head holding plate 320 almost at the center of the plane counter to the head 13. A reference numeral 322 denotes a head regulating plate fixed on a body of the copying apparatus, a spring holding means (pin) 323 is provided at the center of the lower portion, and a head vertical move regulating hole 322a is formed vertically on a top of the spring holding means 323. Then, the head regulating plate 322 has collars 322b, 322c formed on one end and other end horizontally by bending counter each other. The head elevating means 321 of the head holding plate 320 is inserted in the head vertical move regulating hole 322a of the head regulating plate 322, and a tension spring 324 is laid between the head elevating means 321 and the spring holding means 323 of the head regulating plate 322.

In the holding mechanism, the head 13 is subjected to a pushing force downward (in the direction indicated by an arrow "u") at all times by the tension spring 324, and the head regulating plate 322 is supported only on the head elevating means 321. That is, the configuration is such that the head 13 is supported by the head regulating plate 322 at one point. In this case, a vertical move is guided by the head vertical move regulating hole 322a, a horizontal move is also controlled by the head vertical move regulating hole 322a; however, the direction of rotation round the head elevating means 321 is not controlled by the head vertical move regulating hole 322a. Nevertheless, it is controlled by the collar 322c of the head regulating plate 322 whenever rotating beyond a certain angle range.

Accordingly, since the head 13 is inclinable somewhat longitudinally toward its tip, the head tip comes in contact or and presses uniformly on the recording paper.

In the holding mechanism, a play may arise due to the difference between the length of the portion through which the head elevating means 321 is inserted in the hole 322a and the depth of the hole 322a, and results in the head regulating plate 322 being separated from the head holding plate 320. To minimize the separation, a head lift preventive member 325 (collared pin) may be fixed on the head holding plate 320, as illustrated, through a vertical hole 322d formed on the head regulating plate 322. In this case, the collar 322c of the head regulating plate 322 will be unnecessary.

FIG. 26 represents another example of the head holding mechanism. In the example, the head holding plate 320 is held at one point to a head elevating means 326 through a rotation holding member 327 and also held movably up and down so that the head elevating means 326 is downwardly biased from fixing means 328. The fixing means 328 is fixed on the copying apparatus body.

FIG. 27 shows the mechanism in detail. The head elevating means 326 comprises head regulating blocks 329, 330 provided on a side of the fixing means 328, a shaft 331 laid between both the blocks 329, 330, another head regulating block 333 having a shaft 332, and a pin 335 for locking one end of a spring 334. It further comprises a ⊐-shaped locating block 337 in which the shaft 331 is fitted, a locating block 338 in which the shaft 332 is inserted, and a pin 339 for locking another end of the spring 334 on the side of an elevating plate 336 where the rotation holding member 327 is provided.

In the example, the elevating plate 336 is pushed downward (in the direction indicated by an arrow "u") at all times to the fixing means 328 by the spring 334, and the head 13 is supported at one point on the rotation holding member 327 with its tip inclinable somewhat longitudinally, therefore the head tip comes in contact uniformly along the recording paper.

Figure 28:
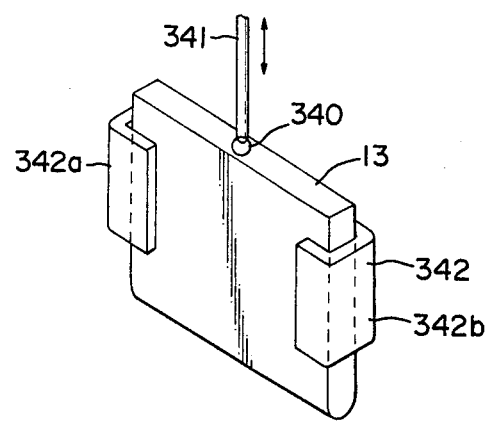
FIG. 28 is a perspective view of a head holding mechanism given in a further embodiment.

FIG. 28 represents another example of the head holding mechanism. In the example, the head 13 is supported on an elevating rod 341 through a universal joint 340, and a pushing force is given elastically downward (not indicated in the drawing) to the elevating rod 341. In the example, a frame-like perpendicular regulating means 342 is provided so that the head 13 is not inclined perpendicularly but inclinable somewhat longitudinally toward the head tip. The regulating means 342 is provided with frames 342a, 342b on both sides and is fixed on the copying apparatus body.

In the example, the head 13 is supported at one point through the universal joint 340, and is inclinable somewhat longitudinally toward its tip for the clearance between the head 13 and the regulating means 342, therefore the head tip comes in contact uniformly along the recording paper.

Figure 29:
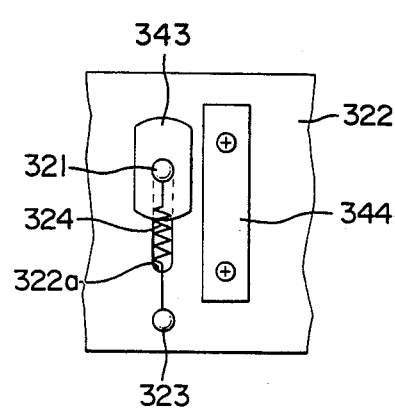
FIG. 29 is a fragmentary view representing a modification of the head holding mechanism shown in FIG. 23.

Then, instead of the head rotation regulating collar 322c (the head lift preventive 325 being not provided) in the example shown in FIG. 23, it may also be configured that a collar plate 343 is fixed on the head elevating means 321 as shown, for example, in FIG. 29. A stopper 344 is fixed on the head regulating plate 322 in the neighborhood along the head vertical move regulating hole 322a, thus the rotating collar plate 343 comes in contact with the stopper 344 at a certain angle. Such configuration can be applied also to the examples shown in FIG. 25 and FIG. 27.

Figure 30:
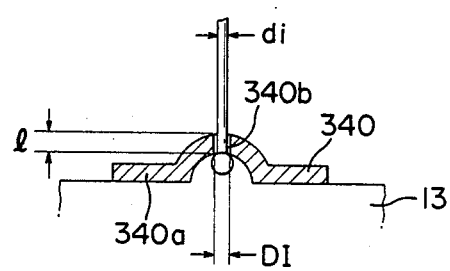
FIG. 30 is a sectional view of a universal joint portion representing a modification of the head holding mechanism shown in FIG. 28.

In the example shown in FIG. 28, the perpendicular regulating means 342 is not necessarily required. That is, as shown in FIG. 30, from properly setting a thickness l of a hole 340b of an upper frame 340a of the universal joint 340, a bore DI of the hole 340b and an outside diameter di of the elevating rod 341, a movement of the elevating rod 341 to the hole 340b is regulated not to exceed a certain angle, and thus a rotatable angle range can be set only at this portion. For example, the smaller the difference between di and DI is and the larger l is, the smaller a movable angle of the rod 341 becomes.

As described, according to the example of the invention, since the head is supported at one point, it comes in contact correctly and smoothly with a recording paper, thus obtaining a fine recorded (printed) image quality.

Further, in the above embodiments, the reference plane is formed by the two rollers. However, such reference plane can be formed by at least one end face of the body and one roller, for example. In this case, one roller serves in function as a running reference roller and a running assistance roller.

What is claimed is:

1. A hand-held copying apparatus comprising:
    reading means for reading in image information;
    storing means for storing and recalling image information read in by said reading means; and
    recording means for copying image information recalled from said storing means onto a copy paper by moving the apparatus manually so that said recording means is moved at a moving speed relative to the copy paper, said recording means including detecting means for detecting the moving speed of said recording means relative to the copy paper, a thermal head having thermal elements which are driven by driving pulses supplied thereto corresponding to said image information recalled from said storing means, and control means responsive to the moving speed detected by said detecting means for supplying said driving pulses to said thermal head which are of narrower pulse width when the moving speed is detected to be relatively higher, and of wider pulse width when the moving speed is detected to be relatively lower.

2. A hand-held copying apparatus according to claim 1, wherein said control means supplies said driving pulses having a pulse width which varies in proportion to the moving speed between an upper value and a lower value, and having a pulse width corresponding to said upper value and said lower value when the moving speed is above and below said values, respectively.

3. A hand-held copying apparatus according to claim 1, wherein said control means further controls the operation of said reading means for reading in image information, and further comprising mode transfer means for switching said control means between controlling said reading means and said recording means.

4. A hand-held copying apparatus comprising:
    reading means for reading in image information;
    storing means for storing and recalling image information read in by said reading means; and
    recording means for copying image information recalled from said storing means onto a copy paper by moving the apparatus manually so that said recording means is moved at a moving speed relative to the copy paper, said recording means including a recording portion and detecting means for detecting the moving speed of said recording portion relative to the copy paper;
    wherein said apparatus has a main body having a bottom portion provided with a pair of rollers which are spaced apart and axially in parallel with each other, said reading means includes a reading portion provided at a leading end of said bottom portion outwardly of one of said pair of rollers, said recording portion is disposed between said pair of rollers, and the one roller disposed between said reading portion and said recording portion provides a moving speed signal to said detecting means when said roller is moved over the surface of the copy paper.

5. A hand-held copying apparatus according to claim 4, wherein said reading portion includes a reading window on the leading end of the bottom portion of the apparatus, said pair of rollers define a reference plane movable over an original surface to be read, and said reading means includes an image sensor having an optical axis in alignment with said reading window which is inclined at an angle to a vertical line perpendicular to the reference plane.

6. A hand-held copying apparatus according to claim 4, wherein said recording means includes means for withdrawing said recording portion into the main body of the apparatus when it is not in use.

7. A hand-held copying apparatus according to claim 4, further comprising an ink ribbon wound on supply and take-up reels and provided movably over said recording portion, wherein said take-up reel is drivingly connected to the other of said pair of rollers to wind said ink ribbon as said recording means is moved over the copy paper.

8. A hand-held copying apparatus comprising:
reading means for reading in image information;
storing means for storing and recalling image information read in by said reading means; and
recording means for copying image information recalled from said storing means onto a copy paper by moving the apparatus manually so that said recording means is moved at a moving speed relative to the copy paper, said recording means including detecting means for detecting the moving speed of said recording means relative to the copy paper, a thermal head having thermal elements in a line which are driven by driving pulses supplied thereto to record image information recalled from said storing means on the copy paper in lines spaced at a timing interval, and control means responsive to the moving speed detected by said detecting means for supplying said driving pulses to said thermal head at a timing interval corresponding to the moving speed, wherein said driving pulses are of narrower pulse width when the timing interval is relatively narrow, and of wider pulse width when the timing interval is relatively wide.

* * * * *